(12) United States Patent
Hagihara et al.

(10) Patent No.: US 7,560,146 B2
(45) Date of Patent: Jul. 14, 2009

(54) POLYMERIZABLE LIQUID CRYSTAL COMPOSITION

(75) Inventors: Kazumi Hagihara, Chiba (JP); Seiki Mitani, Chiba (JP); Ryushi Shundo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 16 days.

(21) Appl. No.: 11/882,110

(22) Filed: Jul. 30, 2007

(65) Prior Publication Data

US 2008/0029734 A1 Feb. 7, 2008

(30) Foreign Application Priority Data

Aug. 1, 2006 (JP) .............................. 2006-209736
May 16, 2007 (JP) .............................. 2007-129966

(51) Int. Cl.
*C09K 19/20* (2006.01)
*C09K 19/34* (2006.01)
*C09K 19/32* (2006.01)
*C09K 19/12* (2006.01)
*C09K 19/38* (2006.01)
*G02B 5/30* (2006.01)

(52) U.S. Cl. .............. 428/1.1; 252/299.01; 252/299.61; 252/299.63; 252/299.66; 252/299.67

(58) Field of Classification Search .................. 428/1.1, 428/1.3; 252/299.01, 299.61, 299.62, 299.63, 252/299.66, 299.67, 299.5
See application file for complete search history.

(56) References Cited

U.S. PATENT DOCUMENTS 6,281,956 B1    8/2001    Ohmuro et al.

(Continued)

FOREIGN PATENT DOCUMENTS

JP    10-152782    6/1998

OTHER PUBLICATIONS

English abstract of JP 2002006138, Jan. 9, 2002, (together with family list).
(Continued)

*Primary Examiner*—Shean C Wu
(74) *Attorney, Agent, or Firm*—Wenderoth, Lind & Ponack, L.L.P.

(57) ABSTRACT

A polymerizable liquid crystal composition excellent in storage stability and UV curing property and a polymer thereof are provided. The polymerizable liquid crystal composition contains a compound represented by formula (1) as a component (A), an optically active compound represented by formula (2) as a component (B), and a mixture of a photopolymerization initiator and a photosensitizer as a component (C), and a ratio of the component (A) is from 77 to 98% by weight, a ratio of the component (B) is from 1 to 15% by weight, and a ratio of the component (C) is from 1 to 8% by weight, based on a total weight of the composition:

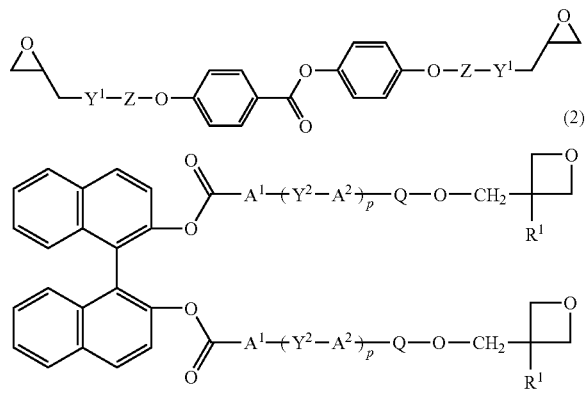

wherein Z independently represents a single bond or alkylene having from 1 to 10 carbon atoms; $Y^1$ independently represents a single bond or —O—; $R^1$ represents methyl or ethyl; $A^1$ and $A^2$ each independently represents 1,4-phenylene or 4,4'-biphenylene; $Y^2$ represents —COO— or —OCO—; Q represents a single bond or oxyalkylene having from 1 to 10 carbon atoms; and p represents 0 or 1.

6 Claims, 2 Drawing Sheets

U.S. PATENT DOCUMENTS

| | | | |
|---|---|---|---|
| 6,642,981 B1 | 11/2003 | Ohmuro et al. | |
| 6,685,998 B1 | 2/2004 | Nishikawa et al. | |
| 7,118,786 B2 | 10/2006 | Aminaka et al. | |
| 7,378,135 B2 * | 5/2008 | Saigusa et al. | 428/1.1 |
| 7,393,569 B2 * | 7/2008 | Ito et al. | 428/1.1 |
| 7,425,354 B2 * | 9/2008 | Yanai et al. | 428/1.1 |
| 7,476,423 B2 * | 1/2009 | Hirai | 428/1.1 |
| 7,488,519 B2 * | 2/2009 | Hirai | 428/1.1 |
| 2005/0082513 A1 * | 4/2005 | Seki et al. | 252/299.01 |
| 2005/0179005 A1 | 8/2005 | Kato et al. | |
| 2007/0122565 A1 * | 5/2007 | Shundo et al. | 428/1.1 |

OTHER PUBLICATIONS

English abstract of JP 10153802, Jun. 9, 1998, (together with family list).

English abstract of JP 2005263778, Sep. 29, 2005, (together with family list).

Yuzo Hisatake et al., "A Novel Transflective TFT-LCD using Cholesteric Half Reflector", Asia Display / IDW '01 LCT8-2, pp. 129-132, 2001.

D.J. Broer et al., "Synthesis and Photopolymerization of a Liquid-Crystalline Diepoxide", Macromolecules, vol. 26, pp. 1244-1247, 1993.

Günter Schnurpfeil et al., "Synthesis and Photoinitiated Polymerization of Nematic Liquid-Crystalline Diepoxides", Macromol. Chem. Phys., vol. 202, pp. 180-187, 2001.

* cited by examiner

POLYMERIZABLE LIQUID CRYSTAL COMPOSITION

FIELD OF THE INVENTION

The present invention relates to a polymerizable liquid crystal composition exhibiting twisted alignment, a film having optical anisotropy obtained by polymerizing the composition, and use of the film.

BACKGROUND OF THE INVENTION

In recent years, a polymerizable liquid crystal composition has been used in a film having optical anisotropy. A polymerizable liquid crystal composition has optical anisotropy in a liquid crystal state, and alignment of a liquid crystal compound contained is fixed through polymerization. A helical structure is induced by adding an optically active compound to a polymerizable liquid crystal compound or composition, and it is applied to various optical devices depending on the pitch of helical structure.

Examples of the application utilizing selective reflection visible light include a design purpose, such as an ornamental material, and a color filter used in a liquid crystal display device. The application thereof also includes a anticounterfeit technology since reflected light and transmitted light have peculiar metallic gloss with change in color depending on viewing angle, and such optical characteristics cannot be duplicated with an ordinary duplicator. Furthermore, owing to application of the circularly polarized light separation function, such a luminance improving film is proposed that has a structure containing a quarter-wavelength plate and an optical anisotropy film exhibiting the circularly polarized light separation function, which are laminated on a polarizing plate. In these applications, the circularly polarized light separation function is demanded to be expressed over the whole visible light region (i.e., a region having a wavelength of from 350 to 750 nm), and accordingly, plural layers having different pitches are laminated, or the pitch is changed continuously in the thickness direction of the film (as described in Y. Hisatake, et al., Asia Display/IDW '01 LCT8-2).

Examples of the application as an optical compensation film of a liquid crystal display include optical compensation in an STN (super twisted nematic) liquid crystal display (as described in JP-A-2002-6138). A film having a fixed cholesteric alignment layer that reflects an ultraviolet ray having a wavelength range of 350 nm or less is referred to as a negative C-plate. A negative C-plate is used as an optical compensation plate suitable for improving viewing angle characteristics of a display device having such a mode as VA (vertically aligned), TN (twisted nematic), OCB (optically compensated birefringence) and HAN (hybrid aligned nematic). A negative C-plate can be used for viewing angle compensation of a VA mode as a combination with an optical compensation layer exhibiting positive birefringence, such as a positive A-plate (as described in JP-A-10-153802 and JP-A-10-152782).

SUMMARY OF THE INVENTION

A first object of the invention is to provide such a polymerizable liquid crystal composition that is excellent in UV curing property. A second object the invention is to provide such a polymerizable liquid crystal solution excellent in storage stability. A third object of the invention is to provide such a polymer film as a negative C-plate that is obtained by aligning and polymerizing the composition on a plastic film.

As a result of investigations made by the inventors to attain the aforementioned objects of the invention, they have found a composition containing a polymerizable liquid crystal, a polymerization initiator and a photosensitizer excellent in UV curing property and storage stability of the solution, and thus the invention has been completed. The inventors also have found that the polymer is excellent as an optical compensation film, such as a negative C-plate, and thus the invention has been completed. The polymerizable liquid crystal composition of the invention is, in one aspect, the following item [1].

[1] A composition containing a compound selected from compounds represented by formula (1) as a component (A), an optically active compound selected from compounds represented by formula (2) as a component (B), and a mixture of at least one photopolymerization initiator and at least one photosensitizer as a component (C), and a ratio of the component (A) being from 77 to 98% by weight, a ratio of the component (B) being from 1 to 15% by weight, and a ratio of the component (C) being from 1 to 8% by weight, based on a total weight of the composition:

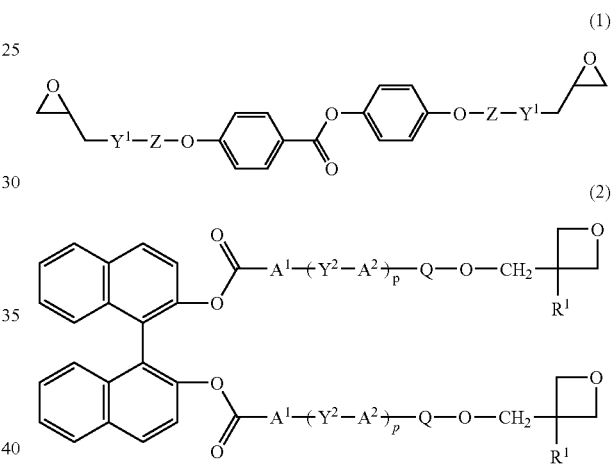

wherein Z independently represents a single bond or alkylene having from 1 to 10 carbon atoms; $Y^1$ independently represents a single bond or —O—; $R^1$ represents methyl or ethyl; $A^1$ and $A^2$ each independently represents 1,4-phenylene or 4,4'-biphenylene; $Y^2$ represents —COO— or —OCO—; Q represents a single bond or oxyalkylene having from 1 to 10 carbon atoms; and p represents 0 or 1.

DETAILED DESCRIPTION OF THE INVENTION

Figure 1:
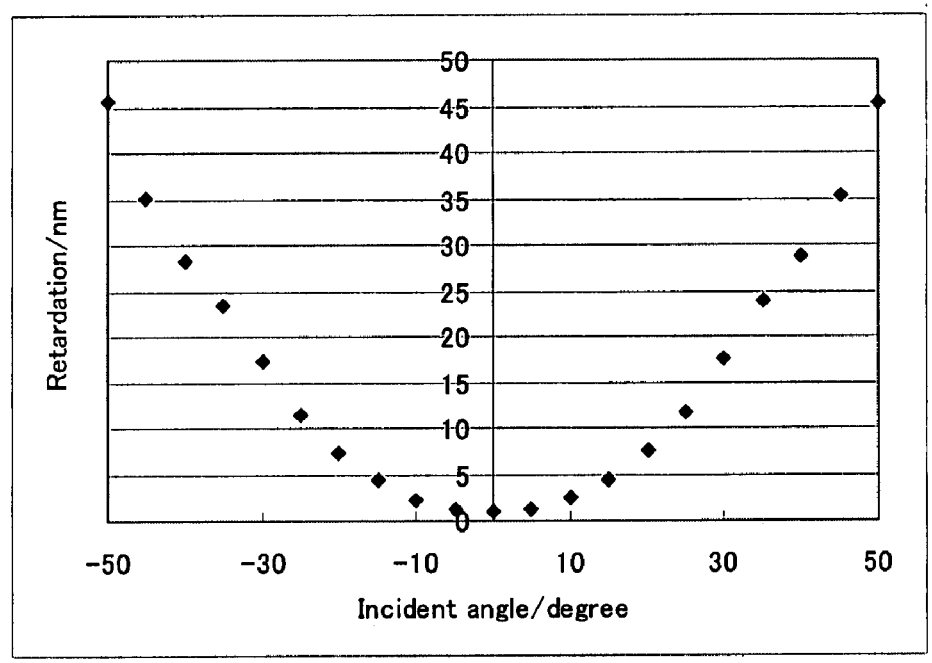
FIG. 1 is a graph showing dependency of retardation on incident angle of a film (F1).

The terms used herein are defined as follows. A liquid crystal compound is a generic term for a compound having a liquid crystal phase, such as a nematic phase and a smectic phase, and a compound having no liquid crystal phase but being useful as a component of a liquid crystal composition. A liquid crystal display device is a generic term for a liquid crystal display panel and a liquid crystal display module. A compound represented by formula (1) is sometimes abbreviated as a compound (1). The abbreviation rule is also applied to other compounds, such as a compound represented by formula (2). In Examples, the weight percentage and weights are data based on values expressed by a mass unit "g" (gram) displayed on an electronic balance.

The invention includes the aforementioned item [1] and also the following items [2] to [6].

[2] The liquid crystal composition according to the item [1], wherein the composition contains a compound selected from compounds represented by formula (1) as a component (A), an optically compound selected from compounds represented by formula (2) as a component (B), and a mixture of at least one diaryliodonium salt selected from compounds represented by formulae (3-1) to (3-6) and at least one photosensitizer selected from compounds represented by formulae (4-1) to (4-6) as a component (C), and a ratio of the component (A) is from 85 to 90% by weight, a ratio of the component (B) is from 5 to 13% by weight, and a ratio of the component (C) is from 1 to 5% by weight, based on a total weight of the composition:

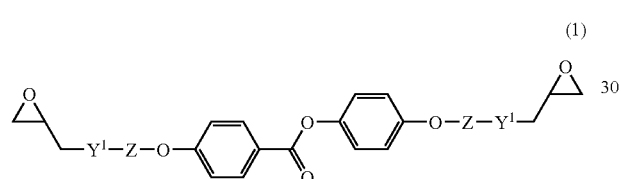
(1)

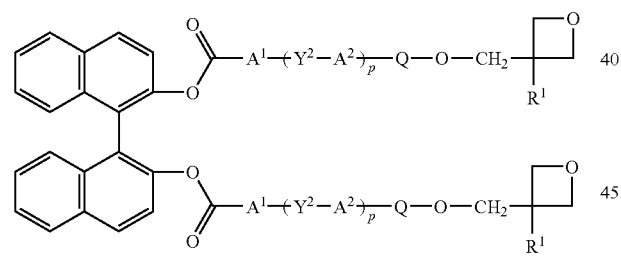
(2)

wherein Z independently represents a single bond or alkylene having from 1 to 7 carbon atoms; $Y^1$ independently represents a single bond or —O—; $R^1$ represents methyl or ethyl; $A^1$ and $A^2$ each independently represents 1,4-phenylene or 4,4'-biphenylene; $Y^2$ represents —OCO—; Q represents a single bond or oxyalkylene having from 2 to 8 carbon atoms; and p represents 0 or 1,

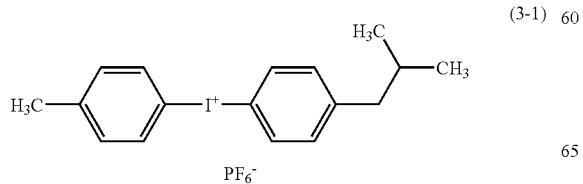
(3-1)

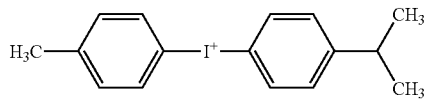
(3-2)

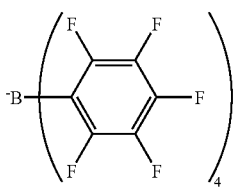
(3-3)

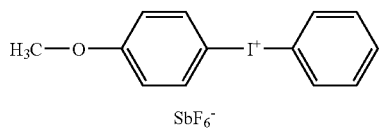
(3-4)

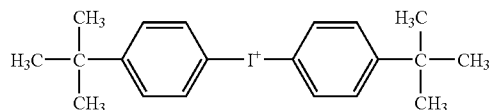
(3-5)

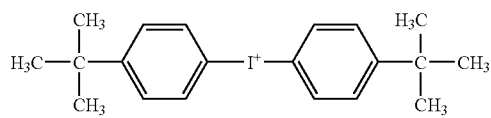
(3-6)

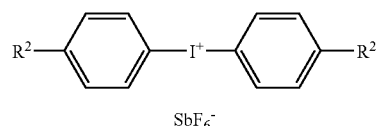
(3-7)

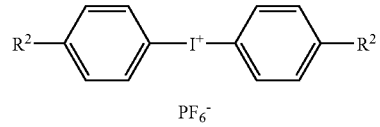
(3-8)

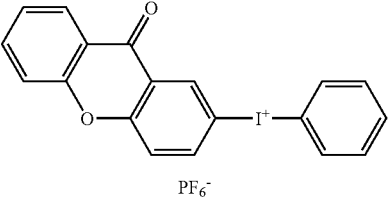

wherein $R^2$ independently represents linear alkyl having from 1 to 15 carbon atoms,

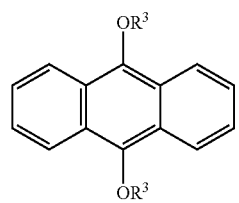
(4-1)

-continued

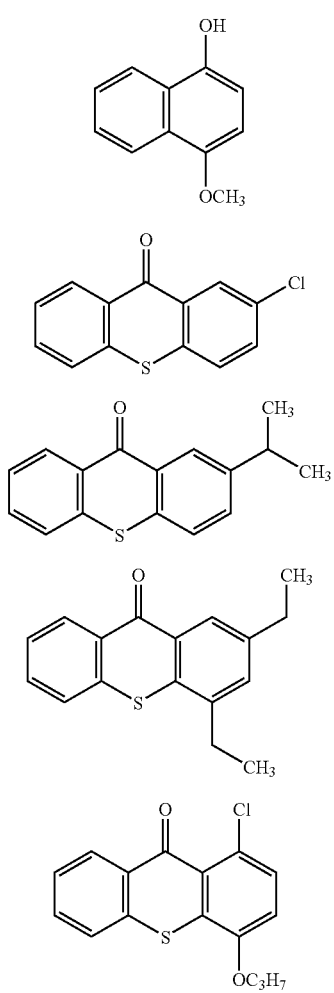

wherein $R^3$ independently represents linear alkyl having from 1 to 10 carbon atoms.

[3] The liquid crystal composition according to the item [2], wherein in formula (1), Z independently represents a single bond or alkylene having from 1 to 4 carbon atoms, and $Y^1$ represents a single bond; in formula (2), Q represents a single bond or oxyalkylene having from 4 to 6 carbon atoms; the component (C) is a mixture of a compound represented by formula (3-1), a compound represented by formula (4-1) and a compound represented by formula (4-2); and the ratio of the component (A) is from 85 t 90% by weight, the ratio of the component (B) is from 8 to 11% by weight, and the ratio of the component (C) is from 2 to 4% by weight.

[4] A polymer obtained by polymerizing the polymerizable liquid crystal composition according to any one of the items [1] to [3].

[5] A polymer film having optical anisotropy obtained by aligning and polymerizing the polymerizable liquid crystal composition according to any one of the items [1] to [3] on a transparent plastic film.

[6] Use of the polymer film having optical anisotropy according to the item [5] as a negative C-plate.

The polymerizable liquid crystal composition of the invention contains at least one compound represented by formula (1) as the component (A).

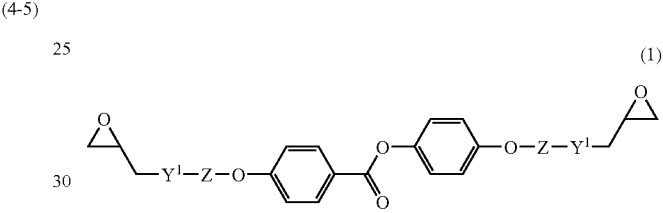

In formula (1), Z independently represents a single bond or alkylene having from 1 to 10 carbon atoms. The alkylene is preferably linear alkylene but may be branched alkylene. In the case where Z is alkylene, the preferred range of the carbon number thereof is from 1 to 7, and more preferably from 1 to 4. $Y^1$ independently represents a single bond or —O—, and preferably a single bond.

The compound (1) is a liquid crystal compound. Specific examples of the compound (1) include compounds (1-1) to (1-6). These compounds have a nematic liquid crystal phase at room temperature. The compound (1) has an oxyranyl group as a polymerizable group and thus is expected to have an effect of accelerating polymerization reaction.

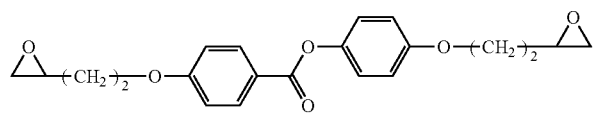

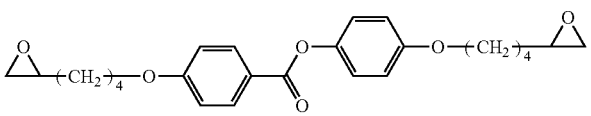

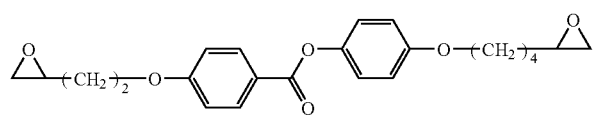

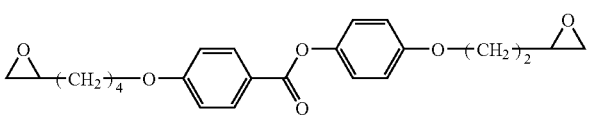

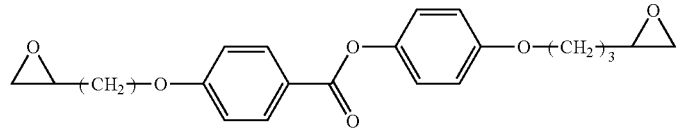

-continued

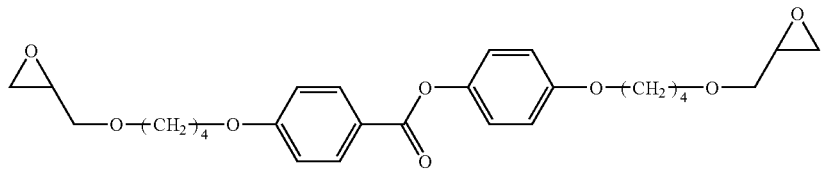
(1-6)

The synthesis methods of the compounds (1-1) to (1-6) are disclosed in Macromolecules, vol. 26, pp. 1244-1247 (1993), Macromol. Chem. Phys., vol. 202, pp. 180-187 (2001) and the like.

The compound (1) exhibits a nematic liquid crystal phase in a wide range of temperature around room temperature and thus is used as a main component for maintaining liquid crystallinity of the composition of the invention. The ratio of the component (A) in the composition of the invention is from 77 to 98% by weight, preferably from 81 to 94% by weight, and more preferably from 85 to 90% by weight, based on the total weight of the composition.

The polymerizable liquid crystal composition of the invention contains at least one compound represented by formula (2) as the component (B).

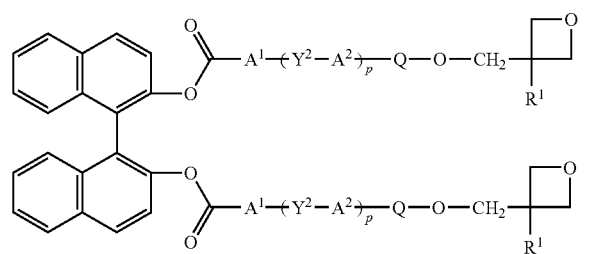
(2)

In formula (2), $R^1$ represents methyl or ethyl. $A^1$ represents 1,4-phenylene or 4,4'-biphenylene, and $A^2$ represents 1,4-phenylene or 4,4'-biphenylene. $Y^2$ represents —COO— or —OCO—. Q represents a single bond or oxyalkylene having from 1 to 10 carbon atoms. The oxyalkylene is preferably a linear group but may be a branched group. p represents 0 or 1.

Preferred examples of the compound (2) include a compound represented by formula (2) wherein $R^1$ represents methyl or ethyl; $A^1$ and $A^2$ each independently represents 1,4-phenylene or 4,4'-biphenylene; $Y^1$ represents —OCO—; Q represents a single bond or oxyalkylene having from 2 to 8 carbon atoms; and p represents 0 or 1.

More preferred examples of the compound (2) include a compound represented by formula (2) wherein $R^1$ represents methyl or ethyl; $A^1$ and $A^2$ each independently represents 1,4-phenylene or 4,4'-biphenylene; $Y^1$ represents —OCO—; Q represents a single bond or oxyalkylene having from 4 to 6 carbon atoms; and p represents 0 or 1.

Specific examples of the compound (2) are shown below.

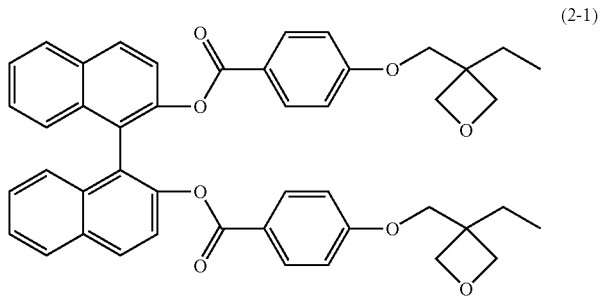
(2-1)

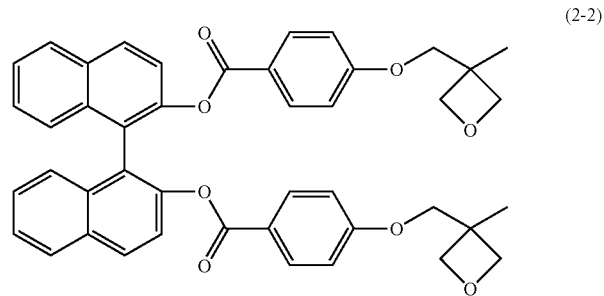
(2-2)

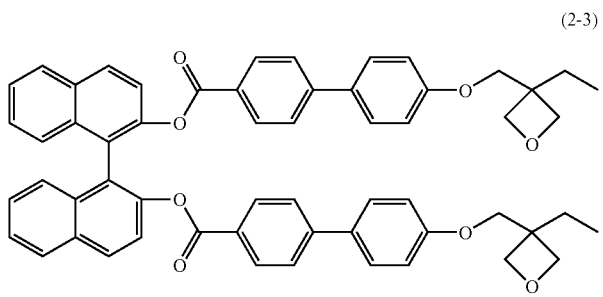
(2-3)

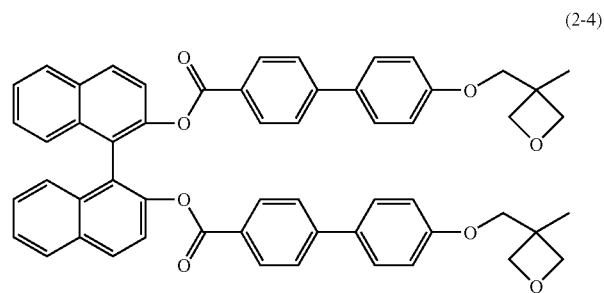
(2-4)

-continued
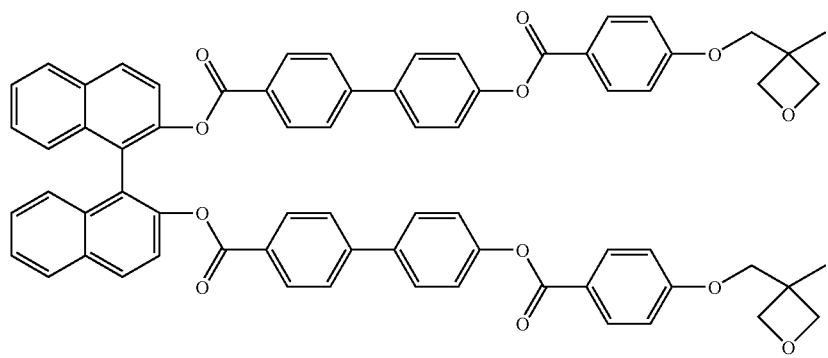
(2-5)
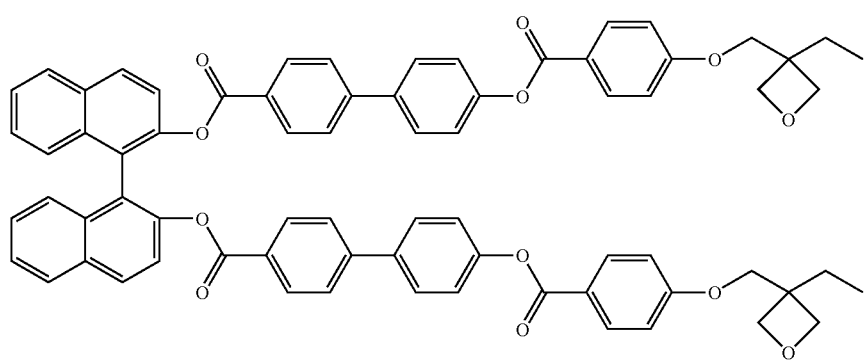
(2-6)
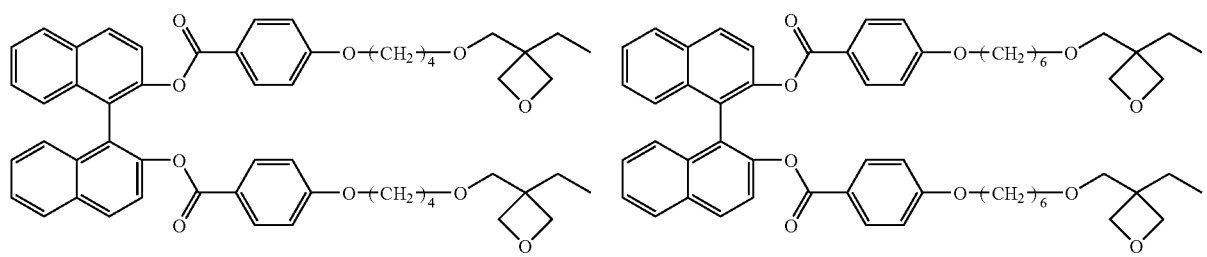
(2-7) (2-8)
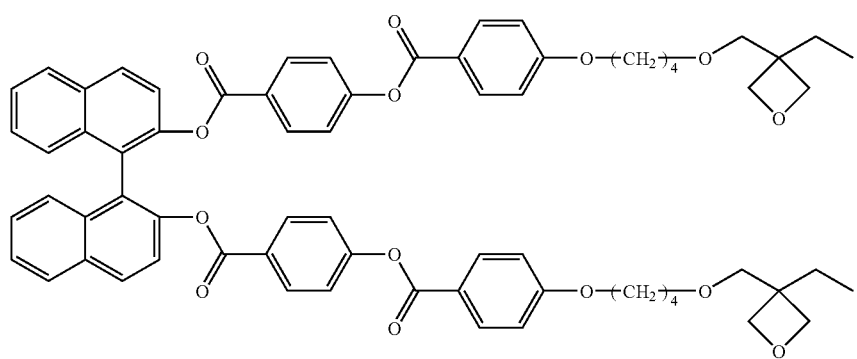
(2-9)

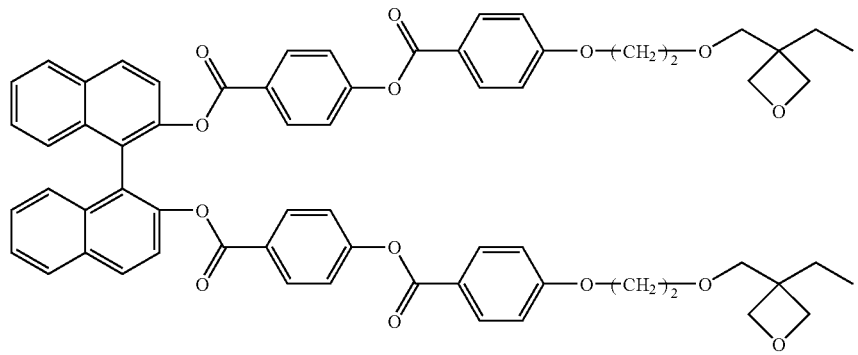
(2-10)

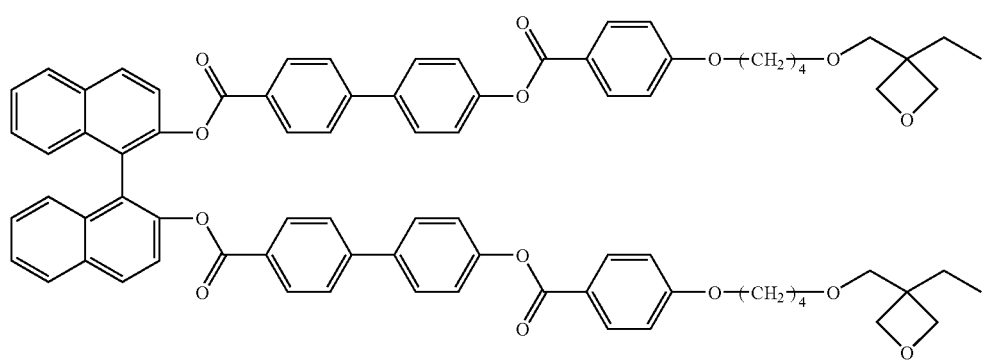
(2-11)

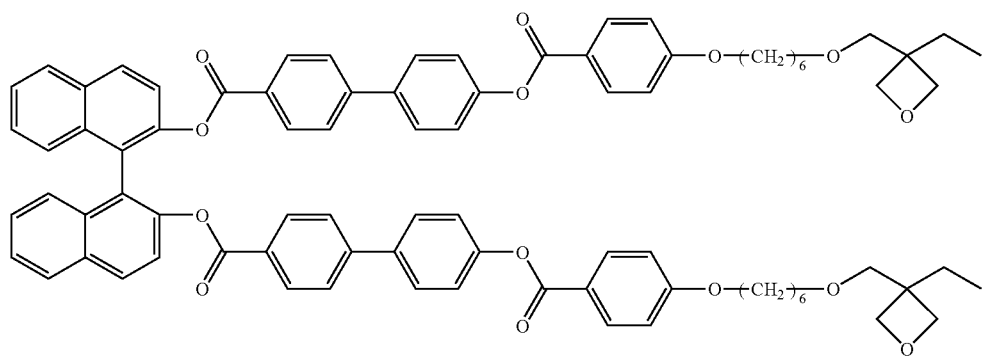
(2-12)

The compounds (2-1) to (2-8) can be synthesized by the method disclosed in Japanese Patent Application No. 2006-248945, which has not yet been laid open until the application is filed.

The compounds (2-9) to (2-12) can be synthesized by the method disclosed in JP-A-2005-263778.

The compound (2) is an optically active compound and exhibits large HTP. The compound does not exhibit liquid crystallinity, but upon mixing the compound with the compound (1), a cholesteric liquid crystal composition having large helix inducing power. The compound (2) has an oxetanyl group and thus is expected to have an effect of accelerating the polymerization reaction rate upon polymerization. The ratio of the component (B) in the composition of the invention is from 1 to 15% by weight, preferably from 5 to 13% by weight, and more preferably from 8 to 11% by weight, based on the total weight of the composition.

The polymerizable liquid crystal composition of the invention contains a mixture of a photopolymerization initiator and a photosensitizer as a component (C). Preferred examples of the initiator include a diaryliodonium salt (hereinafter, referred to as DAS). Particularly preferred examples of the initiator include the following compounds (3-1) to (3-8). The most preferred initiator is the compound (3-1). The polymerization initiator may be used solely or as a mixture of plural kinds thereof.

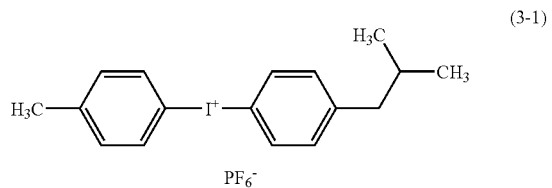
(3-1)

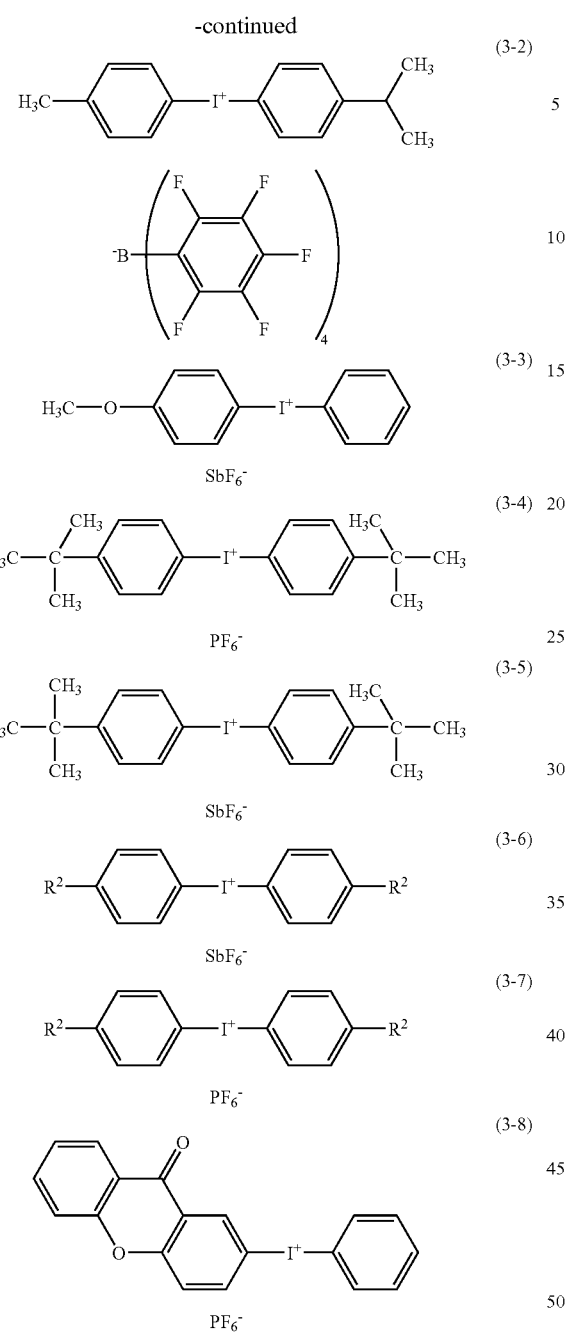

wherein $R^2$ independently represents linear alkyl having from 1 to 15 carbon atoms.

The compound (3-1) is commercially available as Irgacure 250 from Ciba Specialty Chemicals Co., Ltd. The compound (3-2) is commercially available as RHODOSIL Photoinitiator 2094 from Rhodia Silicones. The compound (3-3) is commercially available as MPI-103 from Midori Kagaku Co., Ltd. The compound (3-4) is commercially available as BBI-102 from Midori Kagaku Co., Ltd. The compound (3-5) is commercially available as BBI-103 from Midori Kagaku Co., Ltd. The compound (3-6) wherein $R^2$ represents $C_{12}H_{25}$ is commercially available as UV-9380C from GE Silicones, Inc. The compound (3-8) is commercially available from Wako Pure Chemical Industries, Ltd.

Examples of the photosensitizer include a thioxanthone derivative, an anthraquinone derivative and a naphthoquinone derivative, and preferred examples thereof include the following compounds (4-1) to (4-6). Particularly preferred examples of the photosensitizer include the compounds (4-1) and (4-2). The photosensitizer may be used solely or as a mixture of plural kinds thereof.

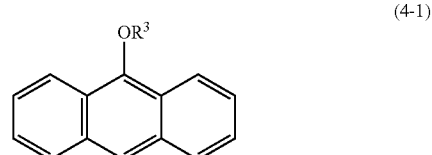

(4-1)

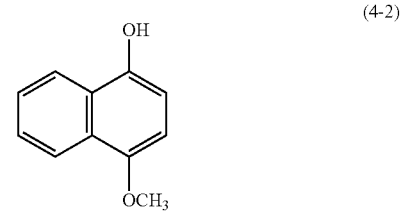

(4-2)

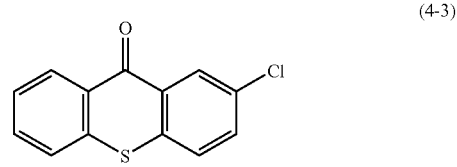

(4-3)

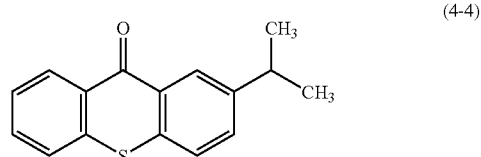

(4-4)

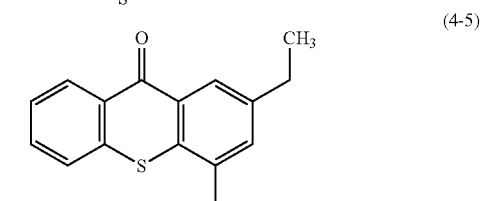

(4-5)

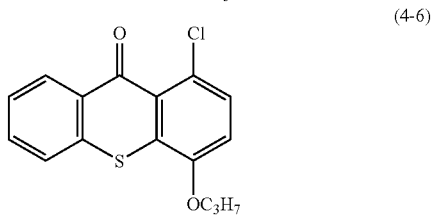

(4-6)

wherein $R^3$ independently represents linear alkyl having from 1 to 10 carbon atoms.

The compound (4-1) wherein $R^3$ represents n-butyl is commercially available as ANTHRACURE UVS-1331 from Kawasaki Kasei Chemicals, Ltd. The compound (4-2) is commercially available as ANTHRACURE ET-2111 from Kawasaki Kasei Chemicals, Ltd. The compound (4-3) is commercially available as Speedcure CTX from Lambson Group, Ltd. The compound (4-4) is commercially available as Quantacure ITX from Shell Chemicals Co. Ltd. The compound (4-5) is commercially available as KAYACURE DETX-S from Nippon Kayaku Co., Ltd. The compound (4-6) is commercially available as Speedcure CPTX from Lambson Group, Ltd.

The sensitivity to light is improved by using DAS and a photosensitizer in combination. The most preferred example of the combination is a combination of the compound (3-1), the compound (4-1) and the compound (4-2). The mixing ratio of the DAS and the photosensitizer is preferably from 10 to 200 parts by weight of the photosensitizer, and more preferably from 20 to 100 parts by weight of the photosensitizer, per 100 parts by weight of the DAS.

The polymerizable liquid crystal composition of the invention has, for example, the following advantages. (1) The composition exhibits a liquid crystal state around room temperature but is not crystallized. (2) The composition shows selective reflection of visible light or lower by adding the compound (1), owing to the sufficiently large helix inducing power of the compound (2). (3) The composition undergoes quick curing reaction by irradiating with an ultraviolet ray to provide a film having no tackiness. (4) The composition is excellent in storage stability as a solution and can be stored at room temperature for a prolonged period of time.

The polymerizable liquid crystal composition of the invention may contain additives depending on necessity for controlling the properties of the polymer. Examples of the additives include a non-liquid crystalline polymerizable compound, a surfactant, an antioxidant, an ultraviolet ray absorbent and a solvent. The atoms constituting the components of the composition may preferably contain isotopes thereof at a ratio larger than the natural abundance since the components have the similar characteristics.

The non-liquid crystalline polymerizable compound is used for controlling the film forming property, the mechanical strength and the like of the polymer. Preferred examples of the non-liquid crystalline polymerizable compound include a vinyl ether compound and an oxetane compound.

Examples of the non-liquid crystalline polymerizable compound include a polymerizable compound suitable for cationic polymerization. Examples of the compound include ethyl vinyl ether, hydroxybutyl monovinyl ether, t-amyl vinyl ether, cyclohexanedimethanol/methyl vinyl ether, 3-ethyl-3-hydroxymethyloxetane, 3-methyl-3-hydroxymethyloxetane, di(3-ethyl-oxetan-3-yl-methyl) and 3-ethyl-3-(2-ethylhexyloxymethyl)oxetane.

Examples of the surfactant include a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amine lauryl sulfate, an alkyl-substituted aromatic sulfonate salt, an alkyl phosphate salt, a perfluoroalkyl sulfonate salt, a perfluoroalkyl carboxylate salt, a perfluoroalkyl ethylene oxide adduct and a perfluoroalkyltrimethylammonium salt. The surfactant has such effect as facilitating a coating operation of the composition on a supporting substrate and the like. The preferred ratio of the surfactant varies depending on the kind of the surfactant, the formulation of the composition and the like, and is from 100 ppm to 5% by weight, and more preferably from 0.1 to 1% by weight, based on the total weight of the composition.

Examples of the antioxidant include hydroquinone, 2,6-di-t-butyl-p-cresol, 2,6-di-t-butylphenol, triphenyl phosphite and trialkyl phosphite. Preferred examples of commercially available products of the antioxidant include Irganox 245 and Irganox 1035, produced by Ciba Specialty Chemicals Co., Ltd.

Examples of the ultraviolet ray absorbent include TINUVIN PS, TINUVIN 292, TINUVIN 109, TINUVIN 328, TINUVIN 384-2, TINUVIN 123, TINUVIN 400 and TINUVIN N400L, produced by Ciba Specialty Chemicals Co., Ltd.

Examples of the solvent include benzene, toluene, xylene, mesitylene, butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, 2,6-dimethylheptanone, cyclopentanone, cyclohexanone, ethyl acetate, ethyl lactate, methyl lactate, ethylene glycol monomethyl ether acetate, propylene glycol monomethyl ether acetate, propylene glycol monoethyl acetate, γ-butyrolactone, 2-pyrrolidone, N-methyl-2-pyrrolidone, dimethyformamide, chloroform, dichloromethane, carbon tetrachloride, dichloroethane, tetrachloroethylene, trichloroethylene, chlorobenzene, t-butyl alcohol, diacetone alcohol, glycerin, monoacetin, ethylene glycol, triethylene glycol, hexylene glycol, ethylene glycol monomethyl ether, ethyl cellosolve, butyl cellosolve, ethanol, methanol, isopropanol and 3-methoxybutyl acetate. The solvent may be used solely or as a mixture of plural kinds thereof.

The polymerization condition of the composition of the invention will be described. A polymer is obtained by polymerizing the composition of the invention. The reaction for polymerization is preferably cationic polymerization. Preferred examples of light used for photopolymerization include an ultraviolet ray, a visible ray and an infrared ray. An electromagnetic wave, such as an electron beam and an X-ray, may also be used. The wavelength of the light may be selected depending on the absorption wavelength of the photopolymerization initiator used. In general, an ultraviolet ray and a visible ray are preferred. The wavelength range is preferably from 150 to 500 nm, more preferably from 250 to 450 nm, and most preferably from 300 to 400 nm. Examples of the light source include a low pressure mercury lamp (such as a bactericidal lamp, a fluorescent chemical lamp and a black light), a high pressure discharge lamp (such as a high pressure mercury lamp and a metal halide lamp), a high pressure discharge lamp (such as a high pressure mercury lamp and a metal halide lamp), and a short arc discharge lamp (such as a super high pressure mercury lamp, a xenon lamp and a mercury xenon lamp). The light source is most preferably a super high pressure mercury lamp. The light emitted from the light source may be radiated as it is on the composition. Light having a specific wavelength (or a specific wavelength range) selected with a filter may be radiated on the composition. The radiation energy density is preferably from 2 to 5,000 mJ/cm$^2$, more preferably from 10 to 3,000 mJ/cm$^2$, and particularly preferably from 100 to 2,000 mJ/cm$^2$. The illuminance is preferably from 0.1 to 5,000 mW/cm$^2$, and more preferably from 1 to 2,000 mW/cm$^2$. The temperature when light is radiated is set in such a manner that the composition has a liquid crystal phase. The radiation temperature is preferably 100° C. or less. In the case where the radiation temperature exceeds 100° C., polymerization may occur due to heat to provide such a possibility that favorable alignment cannot be obtained.

Examples of the shape of the polymer include a film and a plate. The polymer may be molded. In order to obtain the polymer in a film form, a supporting substrate is generally used. The composition is coated on a supporting substrate, and a coated film (paint film) having a liquid crystal phase is polymerized to obtain the film. The preferred thickness of the polymer varies depending on the optical anisotropy value and the purpose of the polymer, and therefore, the thickness cannot be determined unconditionally. In general, the thickness is preferably in a range of from 0.05 to 50 µm, more preferably from 0.1 to 20 µm, and particularly preferably from 0.5 to 10 µm. The haze value of the polymer is generally 1.5% or less. The transmittance of the polymer is generally 80% or more in a visible region. The polymer is suitable as a thin film having optical anisotropy used in a liquid crystal display device.

Examples of the supporting substrate include films of triacetyl cellulose (TAC), polyvinyl alcohol, polyimide, polyester, polyarylate, polyetherimide, polyethylene terephthalate, polyethylene naphthalate and a cycloolefin polymer. Examples of trade names of a commercially available cycloolefin polymer include "Arton" produced by JSR Corp., "Zeonex" and "Zeonoa" produced by Zeon Corp., "APL" produced by Mitsui Chemicals, Inc., and "TOPAS" produced by Ticona, Inc. The supporting substrate may be a uniaxially stretched film or a biaxially stretched film. Preferred examples of the supporting substrate include a TAC film and a cycloolefin polymer film. A TAC film may be used as it is without pretreatment or may be used after subjecting to a saponification treatment. "Zeonex", "APL" and "TOPAS" may be subjected to a surface treatment, such as a corona discharge treatment and an UV-ozone treatment. Examples of the supporting substrate also include a metallic supporting substrate, such as aluminum, iron and copper, and a glass supporting substrate, such as alkaline glass, borosilicate glass and flint glass.

The coated film on the supporting substrate can be prepared by coating the composition as it is. The coated film may also be prepared by coating a solution obtained by dissolving the composition in a suitable solvent, and then removing the solvent. Examples of the coating method include a spin coating method, a roll coating method, a curtain coating method, a flow coating method, a printing method, a microgravure coating method, a wire bar coating method, a dip coating method, a spray coating method and a meniscus coating method.

The factors determining the alignment of the liquid crystal molecules in the polymerizable liquid crystal composition are (1) the kinds of the compounds contained in the composition, (2) the kind of the supporting substrate, (3) the method of alignment, and the like. Accordingly, the alignment also depends on the mixing ratio of the compound (1) and the compound (2) and the material of the supporting substrate. The alignment further depends on the treating method, such as rubbing in one direction with a rayon cloth, obliquely vapor-depositing silicon oxide, and etching in a slit form. In the rubbing treatment, the supporting substrate may be directly rubbed, or in alternative, after coating a thin film of polyimide, polyvinyl alcohol or the like on the supporting substrate, the thin film may be rubbed. Such a special thin film has been known that provides favorable alignment without rubbing treatment. A liquid crystal polymer may be coated on the supporting substrate.

The film as the polymer of the invention will be described. The polymer is obtained by polymerizing the composition of the invention. The polymer film satisfies plural characteristics among such characteristics as colorless and transparent, a small photoelasticity, hard to release from the supporting substrate, tack-free, large heat resistance and large weather resistance. The polymer is also excellent in such characteristics as impact resistance, workability, electric characteristics and solvent resistance. Important characteristics upon preparing the polymer film are hard to release from the supporting substrate, having sufficient hardness, having large heat resistance, and the like.

The thickness (d) of the polymer is controlled as follows. In the method of diluting the composition with a solvent, and then coating the solution on the supporting substrate, a coated film having a target thickness can be obtained by properly selecting such conditions as the concentration of the composition, the method of coating and the condition for coating. A method using a liquid crystal cell is also preferably used. A liquid crystal cell is preferably used since it has an alignment film, such as polyimide. Upon charging the composition into the liquid crystal cell, the thickness of the coated film can be controlled by the gap of the liquid crystal cell.

The use of the polymer is as follows. The polymer can be used as a film having optical anisotropy. Examples of the use of the polymer include an optical film, such as a selective reflection film and a viewing angle compensation film. The polymer may be used as a color filter, a reflection polarizing plate, a phase retarder, an illuminance improving film and a negative C-plate. The polymer may also be used as a cosmetic, an ornamental material, a non-linear optical material and an information memory material.

EXAMPLES

The invention will be described in more detail with reference to the following examples. The invention is not construed as being limited to the examples. The measurement methods for the physical characteristics are described.

<Cellophane Adhesive Tape Peeling Test>

The measurement was carried out according to JIS K5400, 8.5 Adhesiveness (8.5.2 crosscut adhesive tape method). The evaluation was made with the number of squares that were not peeled among 100 squares.

<Pencil Hardness>

The measurement was carried out according to JIS K5400, 8.4 Pencil Scratch Test. The results were expressed by hardness of the pencil tip.

<Heat Resistance Test>

The test was carried out under the condition of 100° C. for 500 hours, and the evaluation was made with fluctuation in retardation. Polyamic acid (PIA5310, produced by Chisso Corp.) was coated on a glass substrate, which was then heated to 210° C. for 30 minutes to prepare a supporting substrate. The surface of the polyimide thus formed was rubbed with a rayon cloth. The composition as a specimen was diluted with a mixed solvent of toluene and cyclopentanone (2/1 by weight) to prepare a solution having a concentration of 30% by weight. The solution was coated on the supporting substrate with a spin coater, and the coated film was heated to 70° C. for 3 minutes and then irradiated with an ultraviolet ray at 60° C. for 10 seconds by using a super high pressure mercury lamp (250 W/cm). The resulting polymer film was measured for retardation at 25° C. The polymer was heated to 100° C. for 500 hours and then again measured for retardation at 25° C. The heat resistance was evaluated by comparing the two measured values. The retardation was measured by using a Senarmont compensator according to the known literature. The wavelength used was 550 nm. The literature was H. Awaya "Kobunshi Sozai no Henko Kenbikyo Nyumon" (Introduction to Polarizing Microscope for Polymer Materials), p. 94, published by Agne Gijutsu Center Co., Ltd. (2001).

<Phase Transition Temperature>

A specimen was placed on a hot plate of a melting point measuring apparatus equipped with a polarizing microscope, and the temperature was increased at a rate of 1° C. per minute. The temperature where a liquid crystal phase was transferred to an isotropic phase (ChI point) was measured.

The ChI point is a maximum temperature of a cholesteric phase or a transition temperature from a cholesteric phase to an isotropic liquid.

<Optical Anisotropy (Δn)>

The retardation (25° C.) of the polymer film was measured according to the aforementioned method of the heat resistance test. The thickness (d) of the polymer film was measured. The optical anisotropy was calculated from the relationship, retardation=Δn×d.

<Alignment of Liquid Crystal Molecules>

The polymer film (liquid crystal oriented film) was prepared on a TAC film having been subjected to a saponification treatment. The alignment of the polymer was determined through analysis with a polarization analyzer based on the dependency of transmission light intensity on angle.

<Measurement with Polarization Analyzer>

A polarization analyzer, OPTIPRO, produced by Thing-Tech Corp. was used. The polymer film was irradiated with light having a wavelength of 550 nm. The retardation (Δn×d) was measured while the incident angle of the light was decreased from 90° with respect to the film surface.

<Confirmation of Tackiness>

The film having been cured with UV was touched with the fingers to confirm the presence of tackiness.

<Confirmation of Storage Stability>

The accelerated test was carried out by placing the solution in an oven at 50° C., and the extent of increase in viscosity was confirmed.

Example 1

<Preparation of Composition (PLC-1)>

A mixture (MIX1) was prepared by using the compound (1-1), the compound (2-12), the compound (3-1), the compound (4-1) and the compound (4-2). The mixture (MIX1) exhibited a cholesteric liquid crystal phase and was not immediately crystallized at room temperature (25° C.). The mixture (MIX1) had a ChI point of 43° C.

Mixture (MIX1):

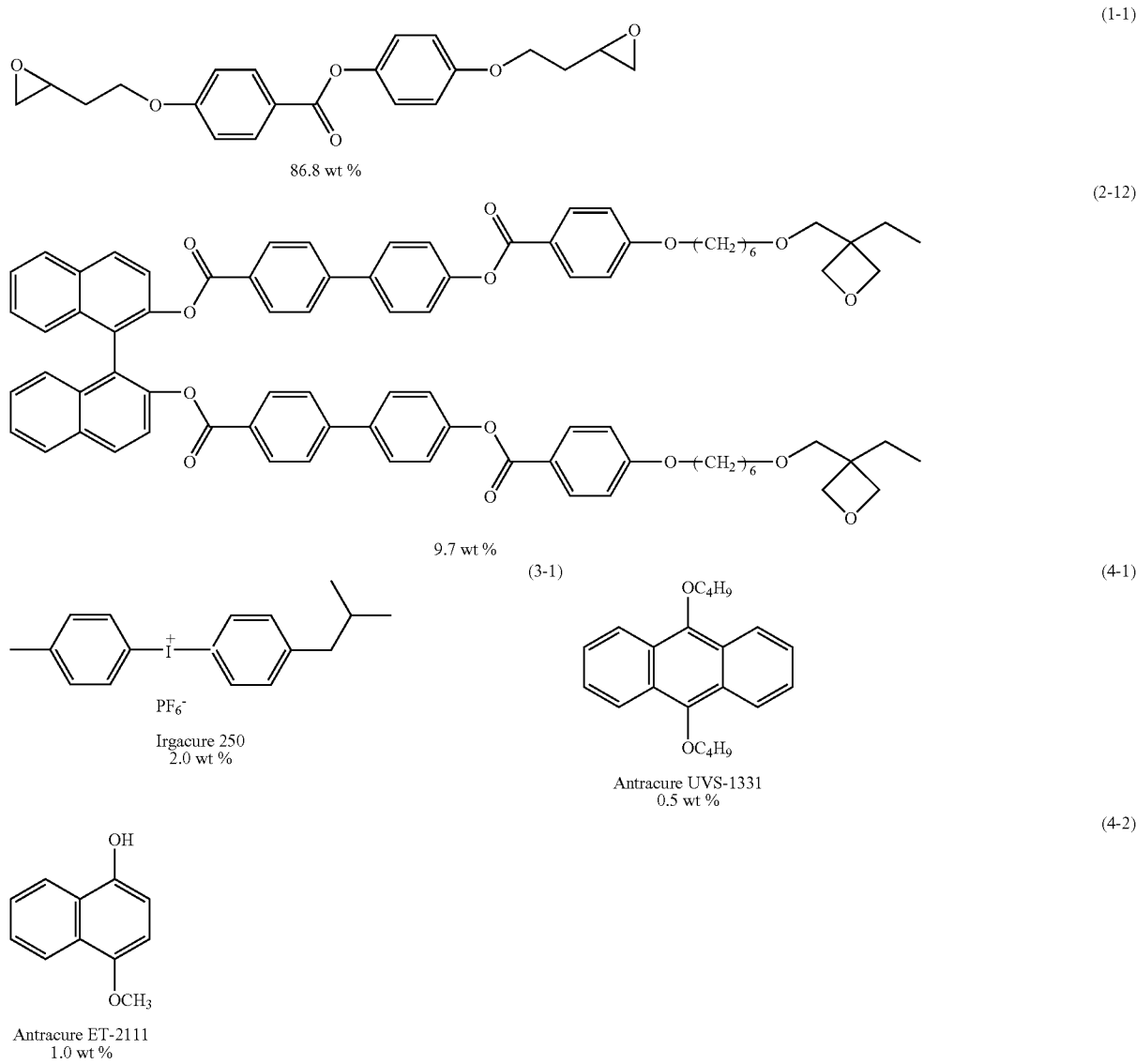

A mixed solvent of toluene and cyclopentanone (7/3) was added to the mixture (MIX1) to prepare a solution having a content of (MIX1) of 25% by weight. The solution was designated as a composition (PLC-1).

Example 2

<Production of Negative C-Plate (F1)>

Figure 2:
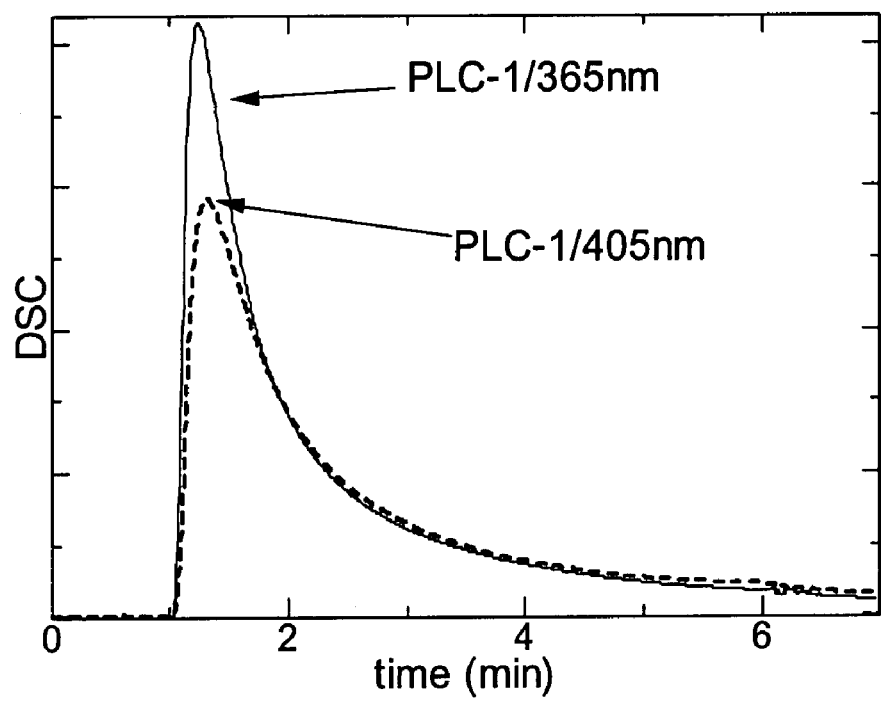
FIG. 2 is a graph showing measurement results of PLC-1 with a photo DSC.

A triacetyl cellulose (TAC) film having been subjected to a saponification treatment was used as a supporting substrate. The surface of the film was rubbed with a rayon cloth. The composition (PLC-1) obtained in Example 1 was coated on the TAC film by using a spin coater. After coating, the solvent was removed by treating the coated film in an oven set at 70° C. for 5 minutes to align the liquid crystal layer. The resulting coated film was irradiated with an ultraviolet ray (30 mW/cm², 365 nm) by using a super high pressure mercury lamp (250 W) at 25° C. for 30 seconds to obtain a tack-free polymer film (F1). The measurement results of the film (F1) with a polarization analyzer are shown in FIG. 1. It is understood from the measurement results that the film is a negative C-plate. The surface hardness of the film (F1) was HB in terms of pencil hardness. Completely no peeling was observed in the cellophane adhesive tape peeling test, and all the squares remained. No change in retardation was observed after the heat resistance test at 100° C. for 500 hours. Accordingly, the liquid crystal alignment film (F1) was hard to release from the supporting substrate and had optical anisotropy and sufficient hardness. The composition (PLC-1) did not suffer increased in viscosity in the accelerated test at 50° C. The polymerization reaction was observed by using Photo DSC (photochemical reaction calorimeter). The measurement results are shown in FIG. 2. Upon irradiating with light having a wavelength of 365 nm and light having a wavelength of 405 nm, polymerization reaction occurred at both wavelengths. It is understood from the results that the composition (PLC-1) well absorbs light having a long wavelength to undergo polymerization reaction. The photochemical reaction calorimeter measures the amount of heat generated upon polymerization reaction caused by irradiating a specimen with an ultraviolet ray. Polymerization initiators have intrinsic absorption wavelengths respectively, and polymerization reaction occurs upon absorbing an ultraviolet ray of the absorption wavelength. No polymerization reaction occurs even when an ultraviolet ray having a wavelength different from the absorption wavelength is absorbed.

Comparative Example 1

<Preparation of Composition (PLC-2)>

A mixture (MIX2) was prepared by using the compound (1-1), the compound (2-12) and the polymerization initiator (5).

Mixture (MIX2):

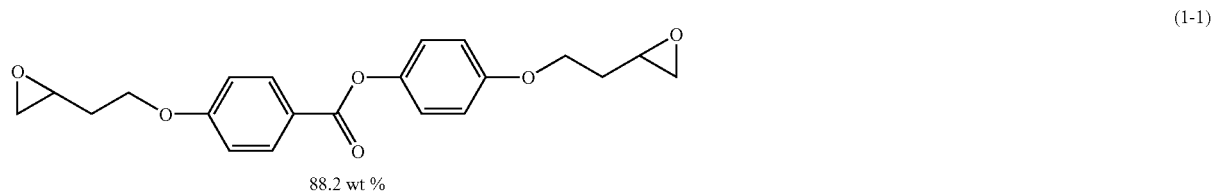

(1-1)

88.2 wt %

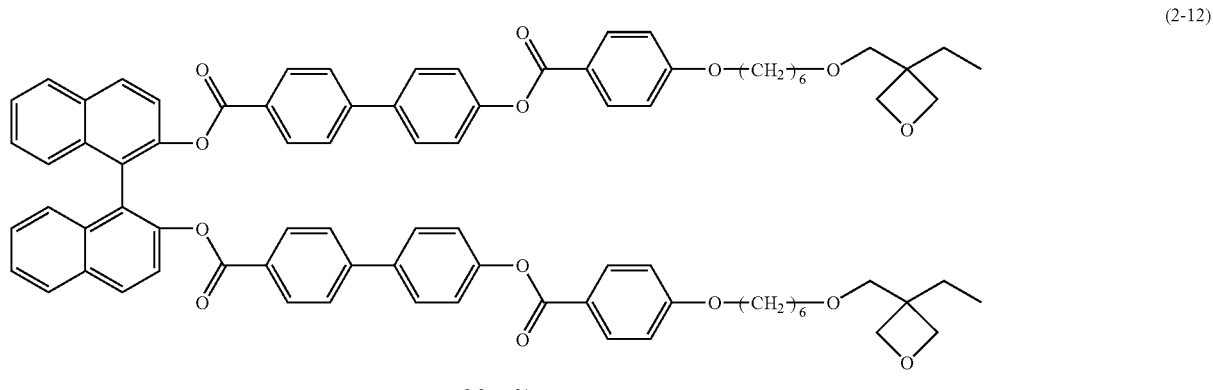

(2-12)

9.8 wt %

(5)

2.0 wt %

A mixed solvent of toluene and cyclopentanone (7/3) was added to the mixture (MIX2) to prepare a solution having a content of (MIX2) of 25% by weight. The solution was designated as a composition (PLC-2).

Comparative Example 2

<Production of Negative C-Plate (F2)>

Figure 3:
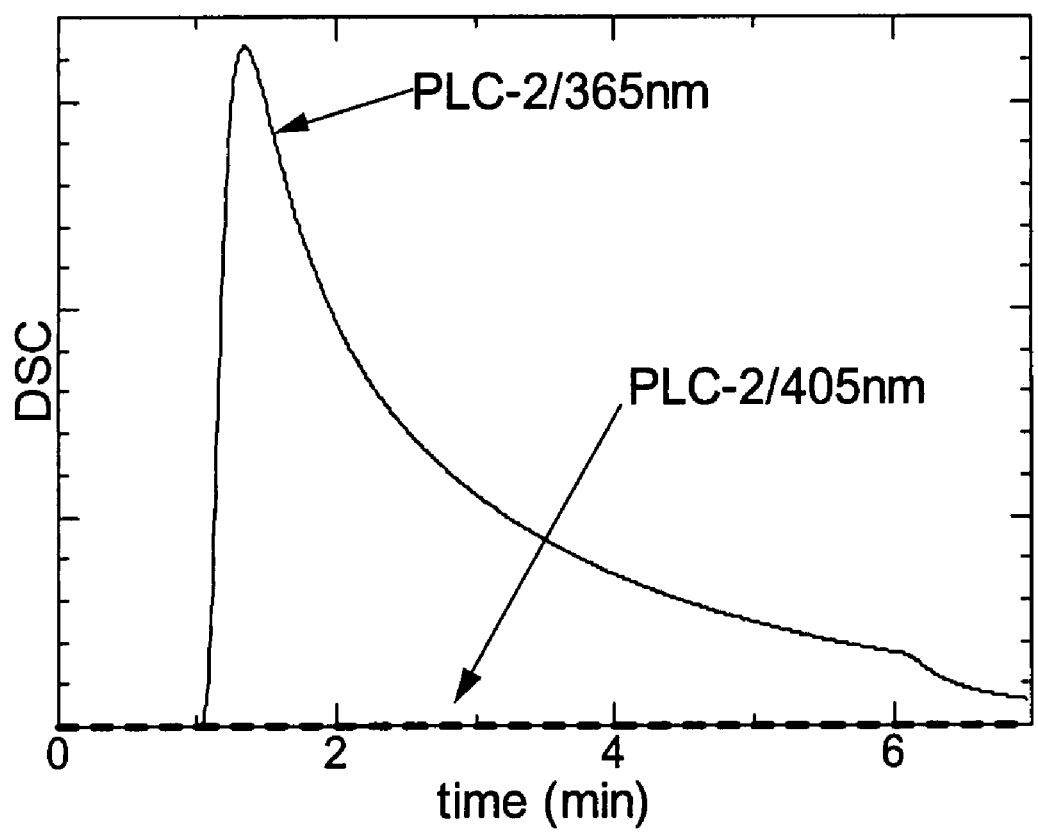
FIG. 3 is a graph showing measurement results of PLC-2 with a photo DSC.

A triacetyl cellulose (TAC) film having been subjected to a saponification treatment was used as a supporting substrate. The surface of the TAC film was rubbed with a rayon cloth. The composition (PLC-2) obtained in Comparative Example 1 was coated on the TAC film by using a spin coater. After coating, the solvent was removed by treating the coated film in an oven set at 70° C. for 5 minutes to align the liquid crystal layer. The resulting coated film was irradiated with an ultraviolet ray (30 mW/cm², 365 nm) by using a super high pressure mercury lamp (250 W) at 25° C. for 30 seconds. A polymer film (F2) having tackiness was obtained through polymerization. The surface hardness of the film (F2) was B or less in terms of pencil hardness. Completely no peeling was observed in the cellophane adhesive tape peeling test, and all the squares remained. Significant change in retardation was observed after the heat resistance test at 100° C. for 500 hours, and no retardation was observed after the test. Accordingly, the liquid crystal alignment film (F2) had tackiness and failed to have heat resistance and hardness that were sufficient for a practical film having optical anisotropy. The composition (PLC-2) suffered increased in viscosity by 5% after lapsing 20 hours in the accelerated test at 50° C. The polymerization reaction was observed by using Photo DSC. The measurement results are shown in FIG. 3. Upon irradiating with light having a wavelength of 365 nm and light having a wavelength of 405 nm, polymerization reaction occurred at 365 nm, but no polymerization reaction occurred at 405 nm. It is understood from the results that the composition (PLC-2) is restricted in wavelength of light necessary for polymerization reaction, and cannot efficiently utilize light from a UV lamp.

INDUSTRIAL APPLICABILITY

The polymerizable liquid crystal composition of the invention is, for example, excellent in sensitivity to UV light, and thus a tack-free film can be obtained with a small UV irradiation amount. The composition is excellent in storage stability of the solution thereof, and thus it suffers no deterioration in quality, such as increase in viscosity, even though it is stored at room temperature for a prolonged period of time. A film obtained by polymerizing the composition of the invention can be used, for example, as a color filter, a reflection polarizing plate, a phase retarder, an illuminance improving film and an optical compensation film, such as a negative C-plate.

What is claimed is:

1. A liquid crystal composition comprising a compound selected from compounds represented by formula (1) as a component (A), an optically active compound selected from compounds represented by formula (2) as a component (B), and a mixture of at least one photopolymerization initiator and at least one photosensitizer as a component (C), and a ratio of the component (A) being from 77 to 98% by weight, a ratio of the component (B) being from 1 to 15% by weight, and a ratio of the component (C) being from 1 to 8% by weight, based on a total weight of the composition:

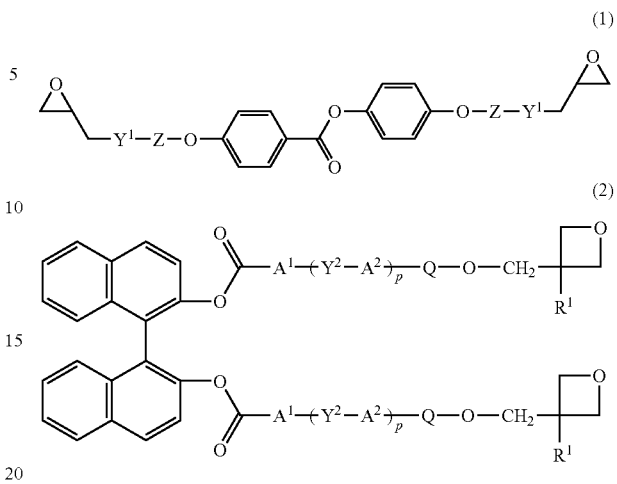

wherein Z independently represents a single bond or alkylene having from 1 to 10 carbon atoms; $Y^1$ independently represents a single bond or —O—; $R^1$ represents methyl or ethyl; $A^1$ and $A^1$ each independently represents 1,4-phenylene or 4,4'-biphenylene; $Y^2$ represents —COO— or —OCO—; Q represents a single bond or oxyalkylene having from 1 to 10 carbon atoms; and p represents 0 or 1.

2. The liquid crystal composition according to claim 1, wherein the composition comprises a compound selected from compounds represented by formula (1) as a component (A), an optically compound selected from compounds represented by formula (2) as a component (B), and a mixture of at least one diaryliodonium salt selected from compounds represented by formulae (3-1) to (3-6) and at least one photosensitizer selected from compounds represented by formulae (4-1) to (4-6) as a component (C), and a ratio of the component (A) is from 85% to 90% by weight, a ratio of the component (B) is from 5 to 13% by weight, and a ratio of the component (C) is from 1 to 5% by weight, based on a total weight of the composition:

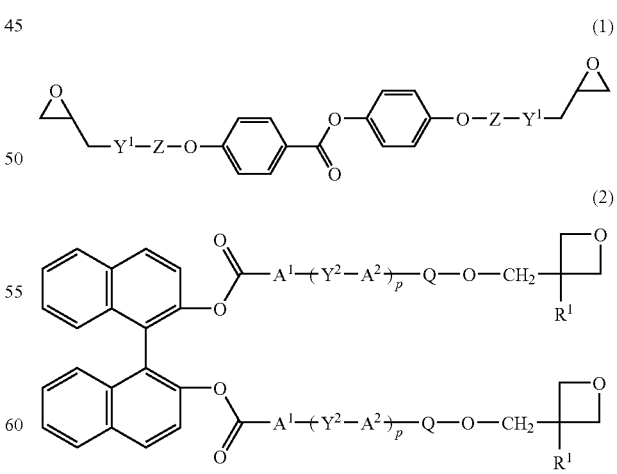

wherein Z independently represents a single bond or alkylene having from 1 to 7 carbon atoms; $Y^1$ independently represents a single bond or —O—; $R^1$ represents methyl or ethyl; $A^1$ and $A^2$ each independently represents 1,4-phenylene or 4,4'-biphenylene; Y² represents —OCO—; Q represents a single bond or oxyalkylene having from 2 to 8 carbon atoms; and p represents 0 or 1,
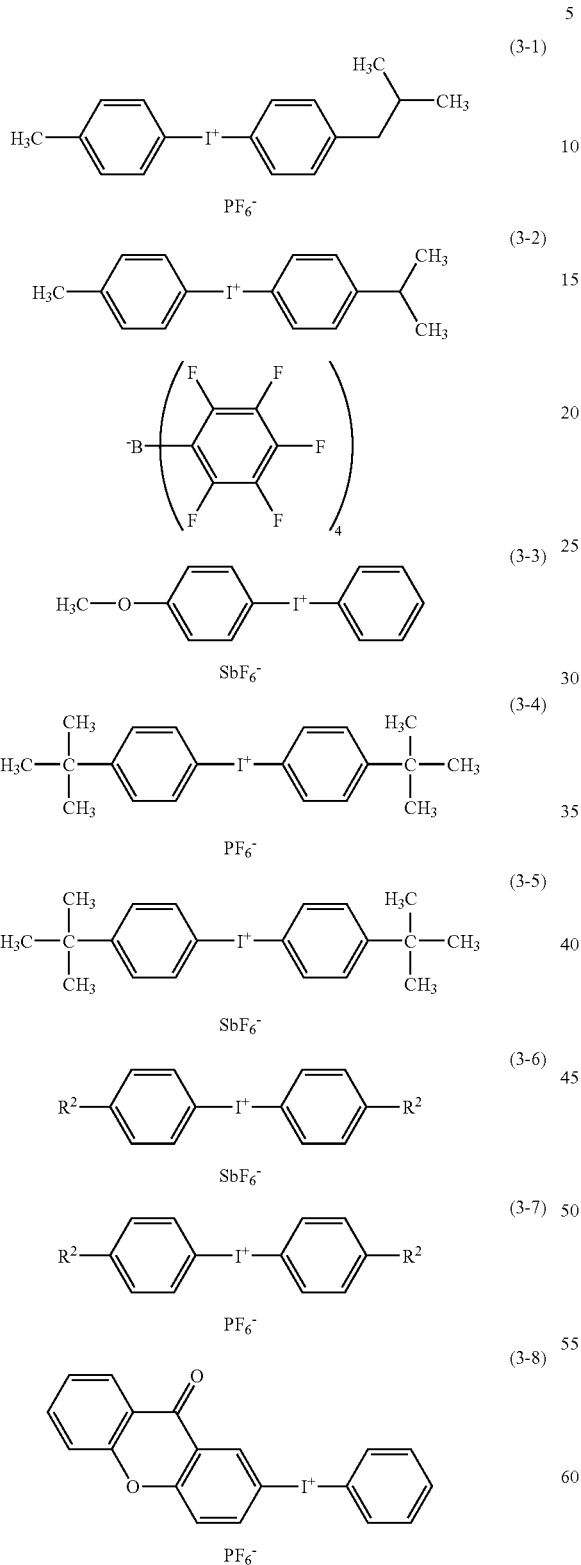
wherein R² independently represents linear alkyl having from 1 to 15 carbon atoms,
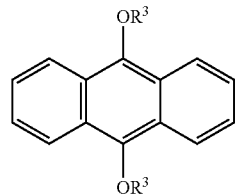
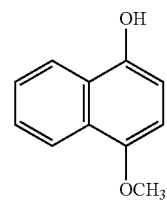
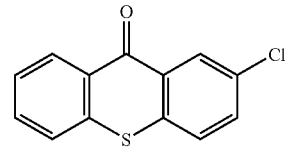
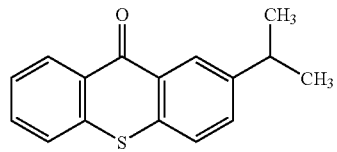
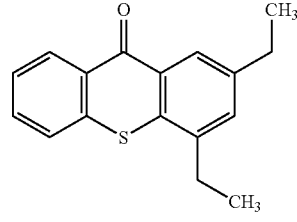
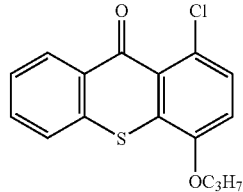
wherein R³ independently represents linear alkyl having from 1 to 10 carbon atoms.

3. The liquid crystal composition according to claim 2, wherein in formula (1), Z independently represents a single bond or alkylene having from 1 to 4 carbon atoms, and $Y^1$ represents a single bond; in formula (2), Q represents a single bond or oxyalkylene having from 4 to 6 carbon atoms; the component (C) is a mixture of a compound represented by formula (3-1), a compound represented by formula (4-1) and a compound represented by formula (4-2); and the ratio of the component (A) is from 85 to 90% by weight, the ratio of the component (B) is from 8 to 11% by weight, and the ratio of the component (C) is from 2 to 4% by weight.

4. A polymer obtained by polymerizing the polymerizable liquid crystal composition according to claim 1.

5. A polymer film having optical anisotropy obtained by aligning and polymerizing the polymerizable liquid crystal composition according to claim 1 on a transparent plastic film.

6. A display device comprising the polymer film having optical anisotropy according to claim 5 as a negative C-plate.

* * * * *